(No Model.)
T. C. DILL.
SPINDLE BEARING.
No. 394,347. Patented Dec. 11, 1888.
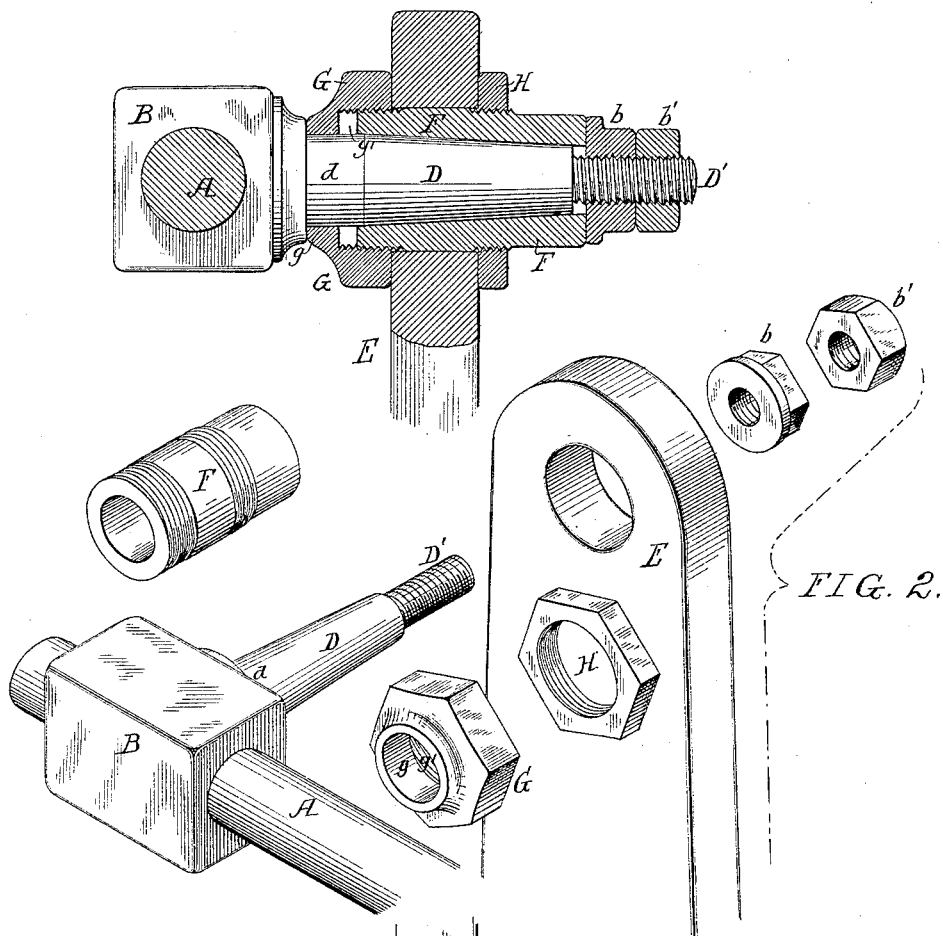
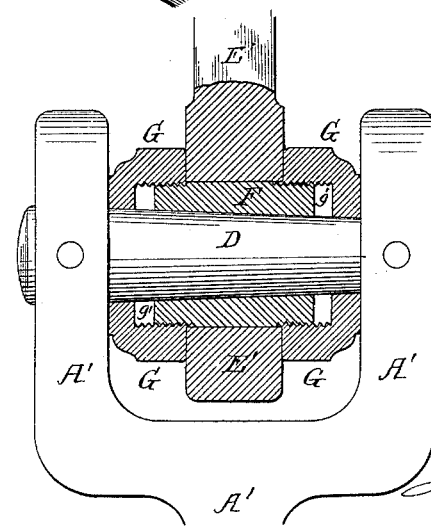
Witnesses:
Wm. D. Conner.
Jos. H. Klein
Inventor:
Thomas Clark Dill,
by his Attorneys.
Howson & Howson

UNITED STATES PATENT OFFICE.

THOMAS CLARK DILL, OF PHILADELPHIA, PENNSYLVANIA.

SPINDLE-BEARING.

SPECIFICATION forming part of Letters Patent No. 394,347, dated December 11, 1888.

Application filed July 13, 1888. Serial No. 279,843. (No model.)

*To all whom it may concern:*

Be it known that I, THOMAS CLARK DILL, a citizen of the United States, and a resident of Philadelphia, Pennsylvania, have invented certain Improvements in Spindle-Bearings, of which the following is a specification.

The object of my invention is to so construct a take-up bearing for the taper pin connecting two devices which must always preserve the same lateral position in respect to each other that said bearing can be adjusted to take up wear without having any tendency to disturb the relative lateral position of the devices connected by the pin, and this object I attain, as fully described hereinafter, reference being had to the accompanying drawings, in which—

Figure 1 is a longitudinal sectional view of the take-up bearing as applied to the valve-operating rod and rocker-arm of a Corliss engine. Fig. 2 is a perspective view of the parts detached from each other, and Fig. 3 is a view showing a modified construction.

Although I will describe my invention as applied to the valve-operating mechanism of a Corliss engine, it will be understood that it may be applied to any connections in which two working parts should bear a fixed lateral relation to each other.

Referring to the drawings, A is the valve-rod of the engine, and B is a block thereon, from one side of which projects a tapered pin, D, having at its outer end a reduced portion, D', provided with a screw-thread.

E is the rocker-arm of the valve-operating disk, and through an opening in this arm is passed a bearing-sleeve, F, having a tapered orifice corresponding to the taper of the pin D. This bearing-sleeve is screw-threaded, preferably in two portions, as shown in the drawings, and adapted to these screw-threaded portions are nuts G and H. The nut G is of the peculiar form shown in Fig. 1, the orifice *g* in the nut fitting snugly to the straight portion *d* of the tapered pin D; but beyond the orifice *g* the nut is counterbored and tapped to receive the screw-threaded end of the bearing-sleeve F, the counterbored portion being of such depth that a space, *g'*, is provided, so that the bearing-sleeve F can be drawn into the nut without affecting the position of the latter, said nut being confined laterally between the block B and arm E.

On the opposite side of the arm E is the confining-nut H, adapted to the other screw-thread on the bearing-sleeve F, this nut serving to lock the bearing-sleeve to the arm E, while the nut G is for the purpose of adjusting the bearing-sleeve on the tapered pin D to take up the wear of said pin and sleeve.

To prevent any longitudinal movement of the pin in the bearing, I tap the outer end, D', of the pin and screw thereon a nut, *b*, and a jam-nut, *b'*.

It will thus be seen that the above-described take-up bearing, when applied to two parts—such as the valve-rod and rocker-arm—provides for taking up the wear without altering the relative lateral position of the two parts, and hence without moving one or other out of line with the other parts of the mechanism.

In Fig. 3 I have shown my improvement applied to the pin connecting two bars, A' and E', together, one being forked at the end. In this instance two nuts G are used, one on each side of the bar E' and bearing against the forked arm A'.

I claim as my invention—

1. The combination, in a take-up bearing, of the two laterally-fixed portions, one having a tapered pin and the other carrying a tapered bearing-sleeve, with an adjusting-nut confined between the two laterally-fixed portions and adapted to a thread on the tapered bearing-sleeve, substantially as described.

2. The combination of the laterally-fixed portions, with a tapered pin, D, on one portion, and a tapered bearing-sleeve, F, carried by the other portion and having screw-threads, and with an adjusting-nut situated between said laterally-fixed portions and adapted to one thread on the bearing-sleeve F, and a locking-nut adapted to the other thread on the sleeve, substantially as described.

3. The combination of the laterally-fixed portions B and E, the tapered pin D, carried by said portion B, the tapered bearing-sleeve F, carried by the portion E, the adjusting-nut G, confined between said parts B and E, a lock-nut, H, on the sleeve, and a confining-nut, b, on the pin D, substantially as set forth.

In testimony whereof I have signed my name to this specification in the presence of two subscribing witnesses.

THOMAS CLARK DILL.

Witnesses:
WILLIAM D. CONNER,
HENRY HOWSON.